US012001390B1

(12) United States Patent
Fan (10) Patent No.: US 12,001,390 B1
(45) Date of Patent: Jun. 4, 2024

(54) METHOD, ELECTRONIC DEVICE, AND COMPUTER PROGRAM PRODUCT FOR DATA STORAGE (71) Applicant: Dell Products L.P., Round Rock, TX (US)

(72) Inventor: Huijuan Fan, Chengdu (CN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 18/172,108

(22) Filed: Feb. 21, 2023

(30) Foreign Application Priority Data

Dec. 30, 2022 (CN) .......................... 202211732886.X (51) Int. Cl.
G06F 16/00 (2019.01)
G06F 11/14 (2006.01)
G06F 16/11 (2019.01)
G06F 16/178 (2019.01)
G06F 16/182 (2019.01)

(52) U.S. Cl.
CPC ........ G06F 16/122 (2019.01); G06F 11/1466 (2013.01); G06F 16/178 (2019.01); G06F 16/1824 (2019.01); G06F 2201/84 (2013.01)

(58) Field of Classification Search
CPC ...... G06F 16/10; G06F 16/11; G06F 16/2365; G06F 2209/486
See application file for complete search history.

(56) References Cited

U.S. PATENT DOCUMENTS

| | | | |
|---|---|---|---|
| 2018/0067819 A1* | 3/2018 | Kotha | G06F 11/1461 |
| 2021/0150383 A1* | 5/2021 | Lindström | G06N 5/04 |
| 2021/0232461 A1* | 7/2021 | Calmon | G06F 11/1464 |
| 2021/0397474 A1* | 12/2021 | Srinivasan | G06F 9/4887 |

* cited by examiner

Primary Examiner — Cheryl Lewis
(74) Attorney, Agent, or Firm — Amin, Turocy & Watson, LLP (57) ABSTRACT Data storage is presented herein. For instance, an example method includes determining, in response to that a predicted backup time of a target object is longer than a threshold time, a target server and a source storage node which are corresponding to the target object, wherein the target server stores objects, and the target server is associated with the source storage node. storage nodes whose predicted backup time for an object is shorter than a corresponding threshold time are determined as candidate storage nodes. A target storage node is determined based on different pieces of performance of the candidate storage nodes. A storage position of the target object is adjusted from the source storage node to the target storage node. Consequently, position distribution of servers on a storage node cluster can be adjusted so as to avoid a synchronization overtime event as much as possible.

20 Claims, 5 Drawing Sheets

| Iteration (start time to end time) | Time consumed for automatic synchronization |
|---|---|
| 9:00-9:30 | 17 minutes |
| 9:30-10:00 | 35 minutes |
| 10:00-10:30 | No new synchronization, 36 minutes |
| 10:30-11:00 | 50 minutes |
| 11:00-11:30 | No new synchronization, 50 minutes |
| 11:30-12:00 | 28 minutes |
| 12:00-12:30 | 20 minutes |
| ... | ... |

METHOD, ELECTRONIC DEVICE, AND COMPUTER PROGRAM PRODUCT FOR DATA STORAGE

RELATED APPLICATION

The present application claims the benefit of priority to Chinese Patent Application No. 202211732886.X, filed on Dec. 30, 2022, which application is hereby incorporated into the present application by reference herein in its entirety.

BACKGROUND

In the field of data storage, for asynchronous replication, once a replication session is established, a system will create two replication system snapshots on a source storage resource and create two replication system snapshots on a target storage resource. The snapshots are used to retain copies of data at time points and maintain a common foundation for both source and target storage resources.

Under an automatic synchronization setting, snapshots will be refreshed according to a recovery point objective (RPO) specified by a user, and only difference data between first and second snapshots will be replicated. RPO is a term in the field of data storage, which refers to an acceptable amount of data that may be lost in an event of a failure. RPO takes time as the unit, and its value is set by a user.

SUMMARY

Embodiments of the present disclosure provide a method, an electronic device, and a computer program product for data storage.

According to a first aspect of the present disclosure, a method for data storage is provided. The method includes determining, in response to that a predicted backup time of a target object is longer than a threshold time, a target server and a source storage node which are corresponding to the target object, wherein the target server stores multiple objects and the target server is associated with the source storage node. The method further includes determining multiple storage nodes whose predicted backup time for an object is shorter than a corresponding threshold time as multiple candidate storage nodes. The method further includes determining a target storage node based on multiple pieces of performance of the multiple candidate storage nodes. The method further includes adjusting a storage position of the target object from the source storage node to the target storage node.

According to a second aspect of the present disclosure, an electronic device is further provided. The electronic device includes a processor and a memory coupled to the processor, wherein the memory has an instruction stored therein, and the instruction, when executed by the processor, enables the device to execute actions. The actions include determining, in response to that a predicted backup time of a target object is longer than a threshold time, a target server and a source storage node which are corresponding to the target object, wherein the target server stores multiple objects and the target server is associated with the source storage node. The actions further include determining multiple storage nodes whose predicted backup time for an object is shorter than a corresponding threshold time as multiple candidate storage nodes. The actions further include determining a target storage node based on multiple pieces of performance of the multiple candidate storage nodes. The actions further include adjusting a storage position of the target object from the source storage node to the target storage node.

According to a third aspect of the present disclosure, a computer program product is provided. The computer program product is tangibly stored on a computer-readable medium and includes computer-executable instructions, wherein the computer-executable instructions, when executed by a device, cause the device to perform a method according to the first aspect.

The Summary of the Invention part is provided to introduce the selection of concepts in a simplified form, which will be further described in the Detailed Description below. The Summary of the Invention part is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid in understanding, and are not intended to limit the scope.

Embodiments of the present disclosure relate to the field of computers, and more specifically, to a method, an electronic device, and a computer program product for data storage.

In the field of data storage, for asynchronous replication, once a replication session is established, a system will create two replication system snapshots on a source storage resource and create two replication system snapshots on a target storage resource. The snapshots are used to retain copies of data at time points and maintain a common foundation for both source and target storage resources. Under an automatic synchronization setting, snapshots will be refreshed according to a RPO specified by a user, and only difference data between first and second snapshots will be replicated.

It is found in research that in an actual use scenario, it is difficult for users to provide an accurate RPO value that is most suitable for their own situations. Users may only give a rough value according to their general usage scenarios. Therefore, when the performance of a system becomes too high and the difference data required for replication is too large, there may be a risk of "overtime" synchronization, and automatic synchronization of new incremental data copies cannot be completed within the RPO time specified by users. Automatic data synchronization may exceed the RPO and bring a data unavailability or data loss (DUDL) risk to customers.

In view of this, the present disclosure provides a method for data storage. By means of the method, position distribution of servers on a storage node cluster can be adjusted before an actual automatic synchronization starts, so that the servers can be transferred to idle storage nodes, thus avoiding synchronization overtime events as much as possible.

Figure 1:
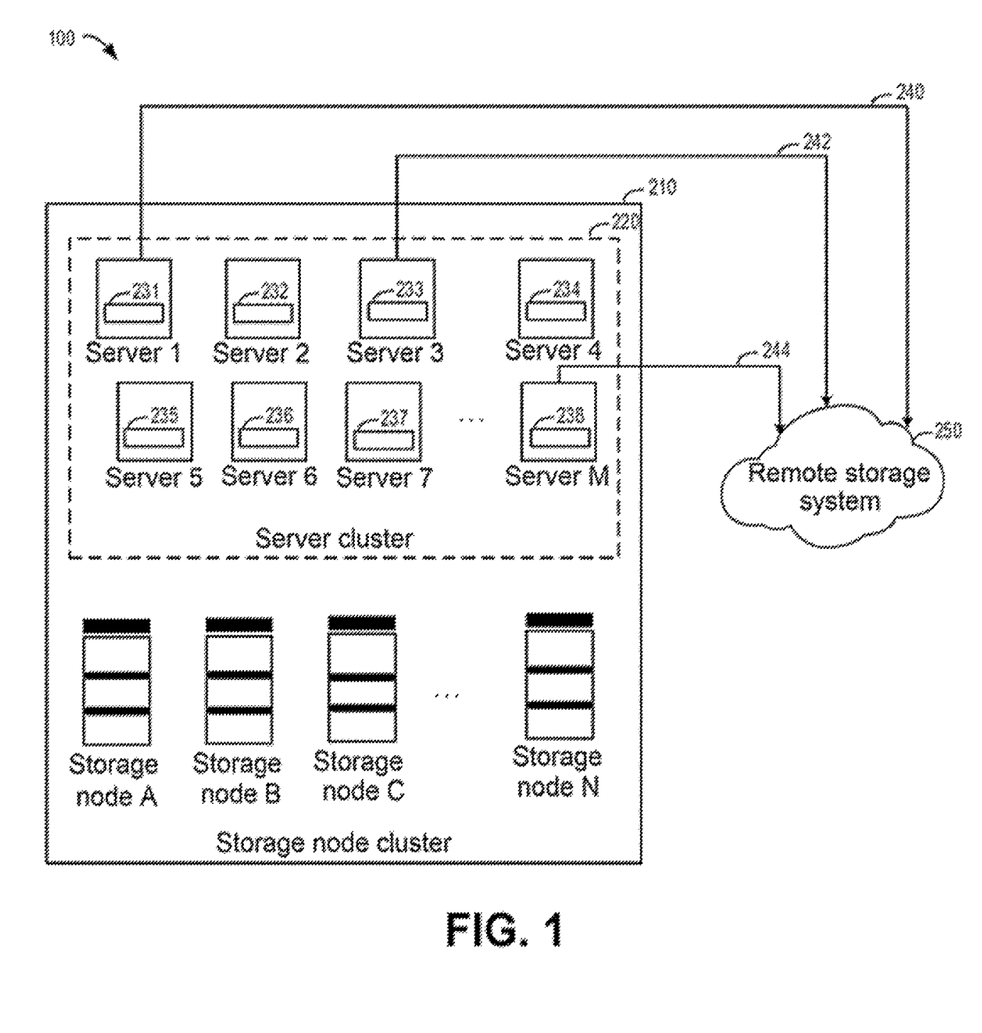
FIG. 1 is a schematic diagram of an example environment in which embodiments of the present disclosure can be implemented.

FIG. 1 is a schematic diagram of example environment 100 in which embodiments of the present disclosure can be implemented. FIG. 1 depicts an architecture of enabling file asynchronous replication on a storage node cluster. In environment 100, storage node cluster 210, server cluster 220, and remote storage system 250 are included. Storage node cluster 210 includes various storage nodes such as storage node A, storage node B, storage node C, and more storage nodes such as storage node N.

Server cluster 220 includes multiple servers such as server 1, server 2, server 3, server 4, server 5, server 6, server 7, and more servers such as server M. A server may be a network attached storage (NAS) server with an information storage function. It is a dedicated data storage server and takes data as the center, completely separates a storage device from the server, and centralizes data management to release bandwidth. Therefore, the server depicted in FIG. 1 is a concept at a business level. It can include embedded system software and provide a cross-platform file sharing function, but it does not necessarily include a server entity.

As stated in FIG. 1, the NAS merges a disk array technology in its file system, which not only improves data reliability, but also improves overall performance of the system by using parallel operations of the disks. Each NAS server may include a file system. For example, server 1 includes file system 231, server 2 includes file system 232, server 3 includes file system 233, and the like. It should be noted that although each server only shows including one file system, each server may include multiple file systems. Storage node cluster 210 may be distributed at any geographical position.

In a case of automatically synchronizing devices, in each RPO, incremental data or difference data will be synchronized to remote storage system 250. For example, for incremental data or difference data of file system 231, synchronization in asynchronous replication session 240 established on server 1 and remote storage system 250 will be provided. For incremental data or difference data of file system 233, synchronization in asynchronous replication session 242 established on server 3 and remote storage system 250 will be provided. For incremental data or difference data of file system 238, synchronization in asynchronous replication session 244 established on server M and remote storage system 250 will be provided.

It can be seen that example 100 shown in FIG. 1 involves three factors for affecting an automatic synchronization process of a replication session. One of the factors may be a computing capability of a storage node where replication sessions of the target NAS server are located. For example, the more powerful a storage node CPU is, and the larger a memory is, the stronger an ability to handle replication sessions of an NAS server residing on it will be.

Another factor may be a total load on a storage node where replication sessions of the target NAS server are located. For example, the lighter the load on the storage node is, the stronger the ability to handle replication sessions of the NAS server residing on it will be.

The third factor may be a load on a target object. For example, the light a write load on a target NAS server/file system is, and the less the difference data that needs to be synchronized in a coming RPO is, the stronger the ability to handle the replication sessions thereof will be. It can be understood that the write load on the target object is determined by service demands of a user.

Figure 2:
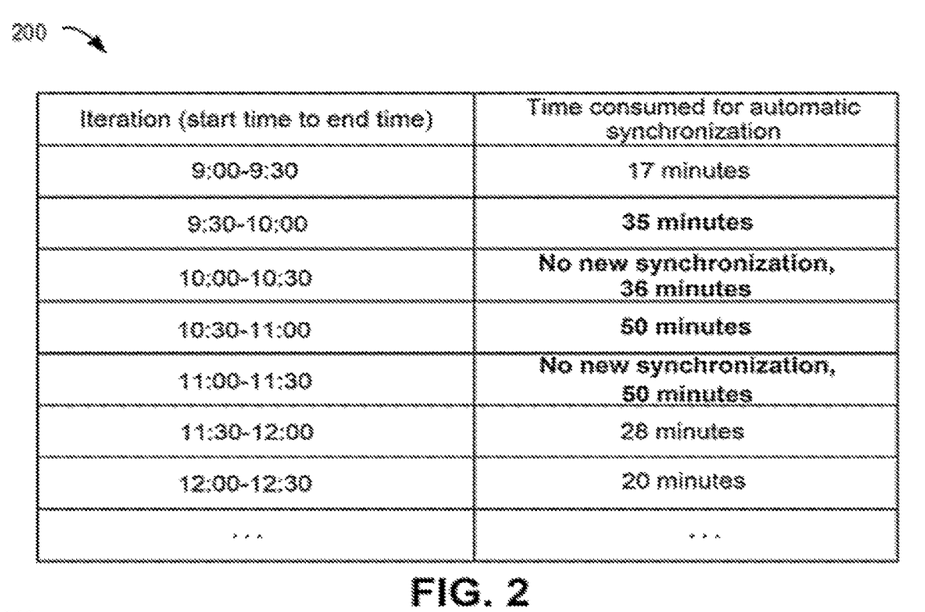
FIG. 2 schematically shows a schematic diagram of an iteration implemented according to an exemplary embodiment of the present disclosure.

FIG. 2 schematically shows a schematic diagram of iteration 200 implemented according to an exemplary embodiment of the present disclosure. In the present disclosure, an iteration refers to an automatic synchronization process, and an object refers to a file system or content that is smaller than the file system in granularity and can be operated by a user. If an asynchronous replication session of an object encounters a case in which automatic synchronization of a new incremental data copy cannot be completed within the RPO time specified by a user, it is considered as an "overtime synchronization" state. Overtime synchronization apparently presents risks for data of customers.

As shown in FIG. 2, it is supposed that a user sets an RPO value as 30 minutes. For each automatic synchronization iteration of the object, a consumed time for the new data copy can be obtained. In FIG. 2, automatic synchronization of replication sessions during iterations 9:30-10:00 and 10:30-11:00 is overtime because their actual consumed time for automatic synchronization exceeds the RPO time specified by the user, i.e., 30 minutes.

Because an overtime synchronization event occurs in an automatic synchronization iteration cycle, it can be defined in historical data whether an iteration has ever experienced overtime synchronization, that is, overtime synchronization occurs in a time period from a start time of the iteration to an end time of the iteration. As shown in FIG. 2, iteration 9:30-10:30 and iteration 10:30-11:30 are considered as extra-time synchronization time periods because of overtime (OT) events in iteration 9:30-10:30 and iteration 10:30-11:30. In the extra-time synchronization time period, asynchronous replication of data is not performed.

Figure 3:
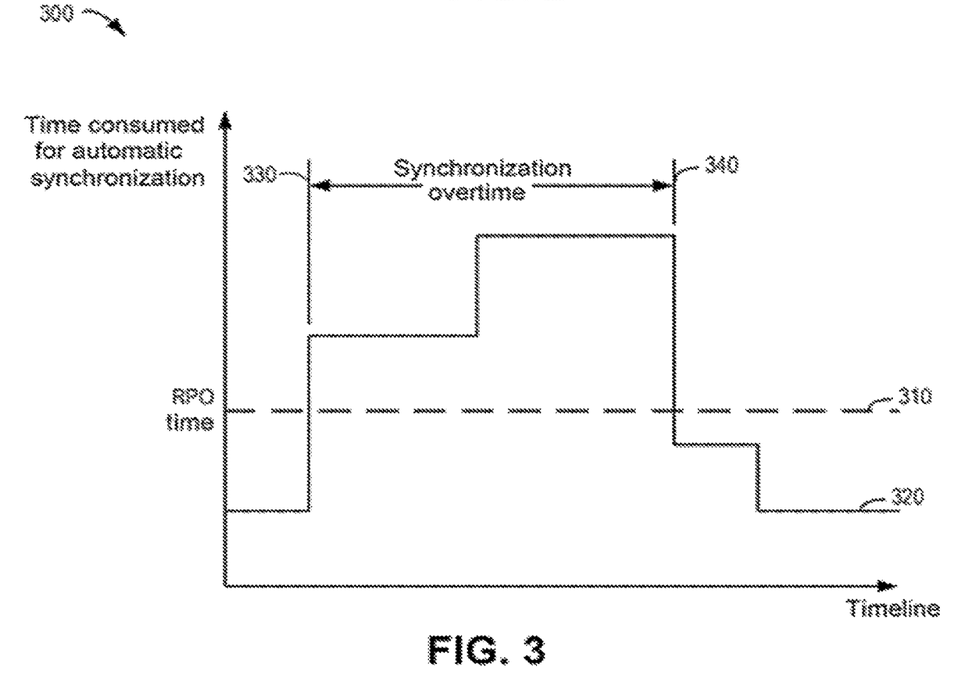
FIG. 3 schematically shows a schematic diagram of synchronization overtime implemented according to an exemplary embodiment of the present disclosure.

FIG. 3 schematically shows a schematic diagram of synchronization overtime 300 implemented according to an exemplary embodiment of the present disclosure. The horizontal axis of FIG. 3 represents a timeline, and the vertical axis represents a time consumed by automatic synchronization. Dotted line 310 represents an RPO time set by a user. Solid line 320 represents a time consumed by the actual automatic synchronization. It can be seen that synchronization overtime occurs during a time period from time 330 to time 340.

It can be understood that there are different scenarios for risky "overtime synchronization" states. If an "overtime synchronization" state continues to iterate, each iteration will take longer than the RPO. If the RPO is 5 minutes, the actual consumed time for synchronization of multiple iterations is 60 minutes. In this case, an alarm can be sent to a user. The user may reevaluate RPO reliability or adjust a system workload or improve system computation performance by means of hardware or software. The method of the present disclosure may alleviate the busy period and better maintain the RPO specified by the user.

Figure 4:
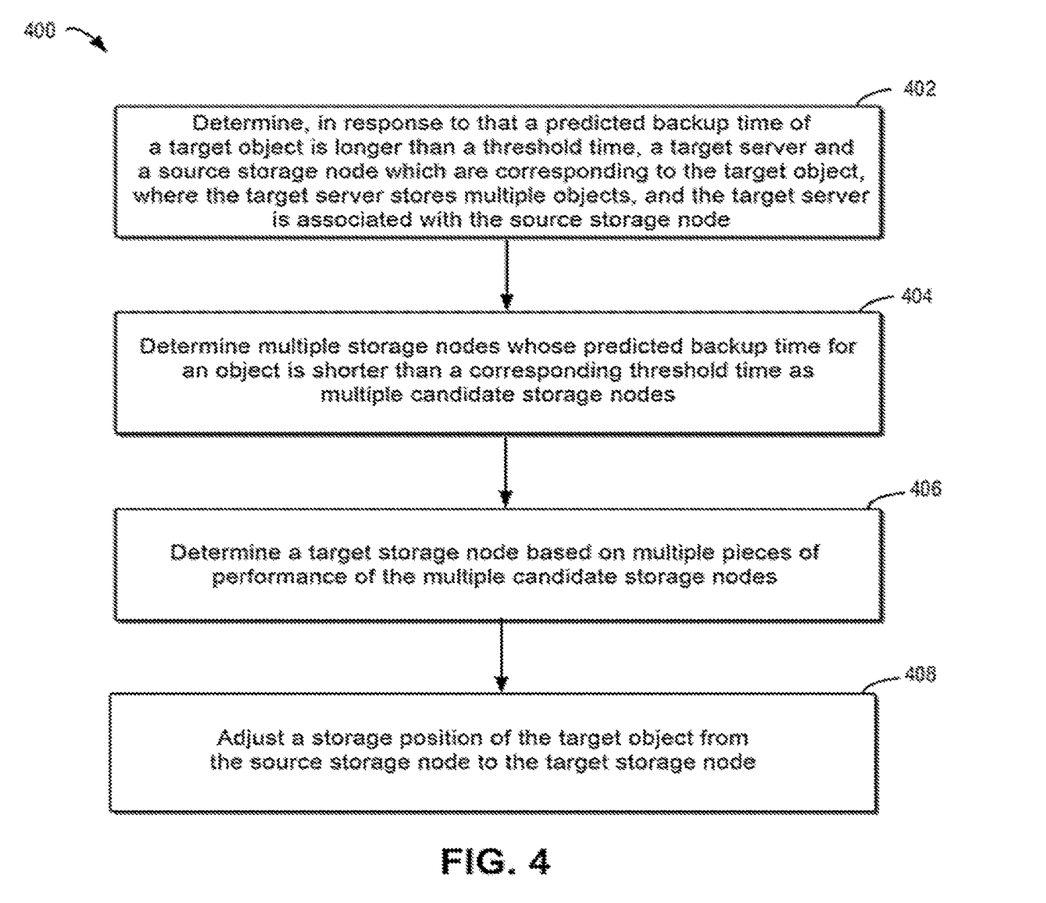
FIG. 4 schematically shows a flow chart of a method for data storage implemented according to an exemplary embodiment of the present disclosure.

FIG. 4 schematically shows a flow chart of method 400 for data storage implemented according to an exemplary embodiment of the present disclosure. At block 402, in response to that a predicted backup time of a target object is longer than a threshold time, a target server and a source storage node which are corresponding to the target object are determined, where the target server stores multiple objects, and the target server is associated with the source storage node.

Based on data learning of automatic synchronization activities of historical replication sessions, an overtime synchronization event that may occur in the future can be predicted, and position distribution of NAS servers on a cluster of storage nodes is further adjusted. By means of transferring an NAS server that may have synchronization overtime risks in a replication session to a storage node with the best performance in the upcoming RPO period, a system may avoid replication session overtime events as much as possible.

Therefore, based on data of automatic synchronization activities of historical replication sessions, an object most likely to have an overtime risk can be determined as the target object. For example, file system 231 is determined as the target object, server 1 where file system 231 is located is determined as a target server, and storage node A where server 1 is located is determined as a source storage node.

At block 404, multiple storage nodes whose predicted backup time for an object is shorter than a corresponding threshold time are determined as multiple candidate storage nodes. For example, in other servers than server 1, it is checked whether file systems thereon have overtime risks. For each of the other servers, it can be checked whether predicted synchronization time of each file system thereon is longer than a corresponding RPO so as to determine whether there is an overtime risk. A storage node corresponding to a server without overtime is chosen as a candidate storage node. For example, storage node B corresponding to server 2 and storage node C corresponding to server 3 do not have overtime risks, and storage node B and storage node C can be chosen as candidate storage nodes.

At block 406, a target storage node is determined based on multiple pieces of performance of the multiple candidate storage nodes. For example, in storage node B and storage node C, storage node B which is relatively idle is chosen as the target storage node. Alternatively, storage node C with a stronger computing ability is chosen as the target storage node. Regarding how to determine the performance of a storage node and how to choose a target storage node, it will be described in combination with FIG. 5.

At block 408, a storage position of the target object is adjusted from the source storage node to the target storage node. An NAS server that may have synchronization overtime risks in a replication session can be transferred to a storage node with the best performance in the upcoming RPO period, then a system may avoid replication session overtime events as much as possible. For example, server 1 is transferred from storage node A to storage node B or storage node C.

By means of method 400, resources of a storage node can be used to obtain better file replication performance and system reliability. Before an actual automatic synchronization starts, position distribution of servers on a storage node cluster is adjusted in a timely manner to enable the servers to be transferred to relatively idle storage nodes or storage nodes with the best performance, so as to avoid synchronization overtime events as much as possible.

Figure 5:
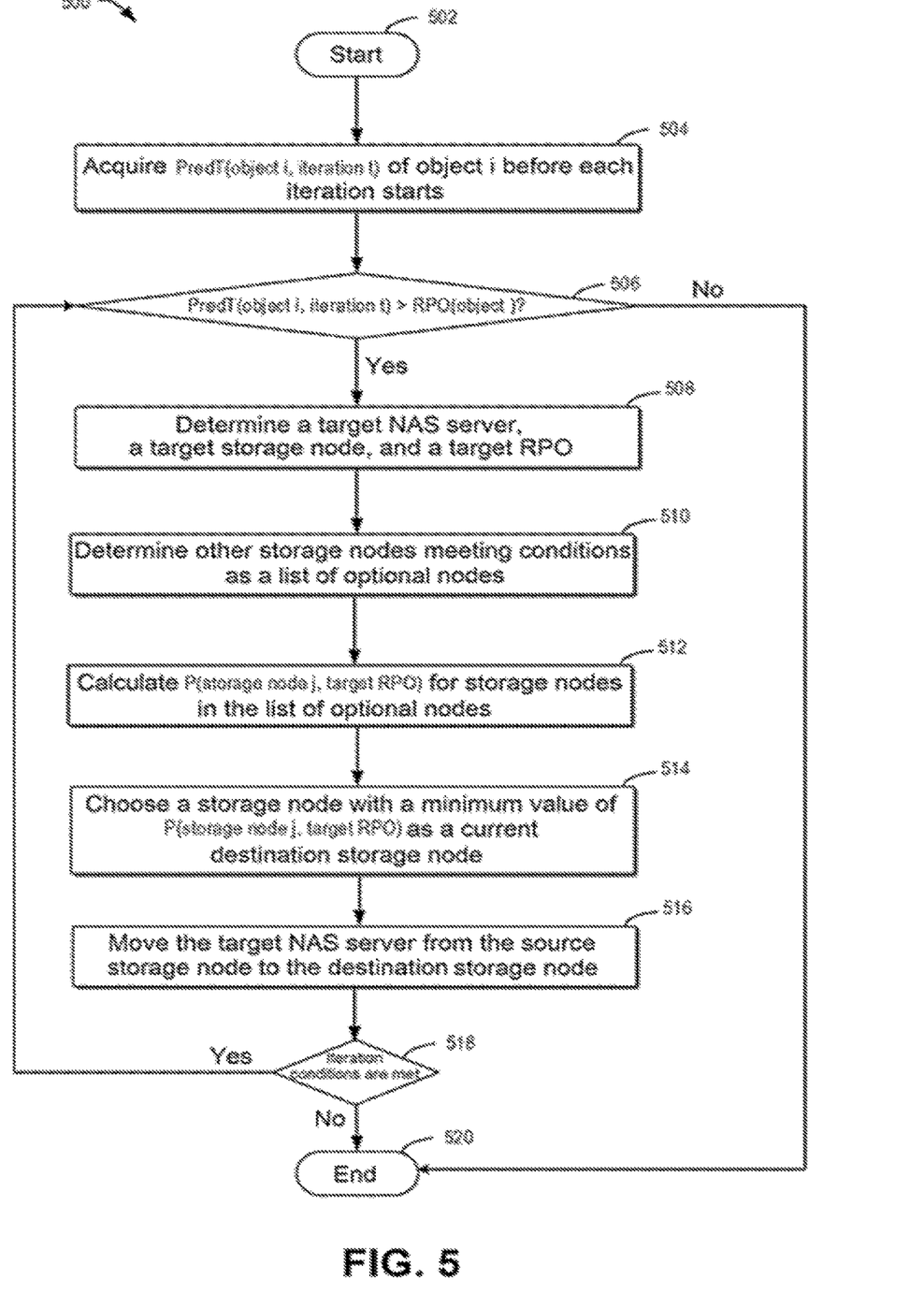
FIG. 5 schematically shows a flow chart of an iterative method for data storage implemented according to an exemplary embodiment of the present disclosure.

FIG. 5 schematically shows a flow chart of iterative method 500 for data storage implemented according to an exemplary embodiment of the present disclosure. Method 500 can be understood as an NAS server position balance algorithm. First, some concepts used in the present disclosure are introduced below.

Overtime Synchronization State Detection

A file asynchronization replication technique supports asynchronization replication of an NAS server and asynchronization replication of a file system with a given RPO setting. Most systems provide existing functions to predict a time required for automatic synchronization, and supposing that for target object i, the time required for automatic synchronization of iteration t is: PredT{Object i, Iteration t}, where t is a start time of the iteration.

Supposing that for target object i, its asynchronization replication session RPO can be represented as RPO{Object i}, an overtime event can be defined as:
PredT{Object i, Iteration i}>RPOObject i}. The greater PredT{Iteration i} is, the more attention that is needed for the iteration will be.

To evaluate the overtime severity, formula (1) can be used to define an overtime degree of the object:

$$OTdegree\{Object\ i, Iteration\ t\} = \frac{PredT\{Object\ i, Iteration\ t\} - RPO\{Object\ i\}}{RPO\{Object\ i\}} \quad (1)$$

where OTdegree{Object i, Iteration t} represents the overtime degree at object i and iteration t.

The overtime severity of the NAS server where the object is located can be represented by formula (2):

$$OTdegree\{Nas\ server\ j, Iteration\ t\} = \Sigma_{Object\ i \in NAS\ server\ j} OTdegree\{Object\ i, Iteration\ t\} \quad (2)$$

where OTdegree{Nas server j, Iteration t} represents the overtime severity of the NAS server where the object is located, object i belongs to NAS server j, and i is to traverse all objects in NAS server j.

It can be understood that at the t-th iteration, multiple NAS servers have overtime risks, and the system tends to choose a server with the greatest risk for balancing. In this way, "overtime synchronization" events are proactively predicted, and distribution of the NAS servers on the cluster of storage nodes is balanced. By means of the overtime synchronization state detection, before each iteration starts, possible overtime synchronization events in the future can be predicted, and it is determined whether the target NAS server is needed for balancing.

Storage Node Performance Evaluation

Generally, storage array performance can be measured on three criteria: CPU utilization, storage utilization, and IO load. The three criteria can be defined in more detail according to actual practice scenarios. No matter which one is too high, it may lead to poor system performance and errors in the future.

According to observation, when a file system or an NAS server (for example, one NAS server includes multiple objects such as replication sessions of 5 file systems, where the 5 file systems reside thereon) is experiencing "overtime synchronization," the utilization of CPU and memory resources is often high, and busy IO workload is under way.

In order to evaluate the performance/total workload of a storage node that may affect data transmission of asynchronous replication sessions, the present disclosure introduces a multi-index weighted performance evaluation method. Three criteria are considered: CPU performance, memory performance, and Input/Output (IO) load performance (including input/output operations per second (IOPS) and bandwidth). Therefore, the comprehensive performance of an upcoming RPO period can be represented as formula (3):

$$P_{storage\ node\ i,RPO} = \omega_{CPU} \cdot P_{CPU,RPO} + \omega_{Mem} \cdot P_{Mem,RPO} + \omega_{IO} \cdot P_{IO,RPO} | \quad (3)$$

where $P_{storage\ node\ i,RPO}$ represents a performance score of storage node i in a given RPO, $P_{CPU,RPO}$ represents utilization of the CPU in a given RPO, for example, a time period of [t, t+RPO]]; $P_{Mem,RPO}$ represents utilization of the memory in the given RPO, $P_{IO,RPO}$ represents an IO load percentage, $\omega_{CPU}$, $\omega_{Mem}$, and $\omega_{IO}$ are weights, $\omega_{CPU} + \omega_{Mem} + \omega_{IO} = 1$, and $P_{IO,Rpo}$ is represented by formula (4):

$$P_{IO,PRO} = P_{IOPS,PRO} + P_{Bandwidth,PRO} \quad (4)$$

where in order to represent the IOPS and the bandwidth in a percentage format like the CPU and the memory, $P_{IOPS,PRO}$ and $P_{Bandwidth,PRO}$ may be enhanced as formula (5) and formula (6):

$$|P_{IOPS,time\ i} = \frac{IOPS_{time\ i}}{IOPS_{max}} \quad (5)$$

$$|P_{bandwidth,time\ i} = \frac{Bandwidth_{time\ i}}{Bandwidth_{max}} \quad (6)$$

where $IOPS_{max}$ represents a maximum theoretical IOPS value, and $Bandwidth_{max}$ represents a maximum theoretical bandwidth value.

Existing data pattern detection and statistical analysis/data fitting model technologies can be used for performance prediction of a future time period [t, t+RPO], such as the least square method, autocorrelation or discrete Fourier transform methods, and a trend function of performance evaluation over time of the storage node can be obtained.

Continue to return to FIG. 5. At block 502, method 500 starts. At block 504, a predicted overtime time of an object is acquired before each iteration starts. For example, for object i and iteration t, an API of a system can be used to acquire a predicted overtime time PredT{Object i, Iteration t}, where i may refer to the number of any existing object. At block 506, if the predicted overtime timePredT{Object i, Iteration t} of any object i is longer than RPOObject i}, it proceeds to block 508. If PredT{Object i, Iteration t} is shorter than or equal to RPO{Object i}, it proceeds to block 520, i.e., the end.

At block 508, OTdegree{Object i, Iteration t} is calculated, and a target NAS server, a target storage node, and a target RPO are determined. In some embodiments, if only one object i in the t-th iteration has an overtime synchronization risk, an NAS server where object i is located is taken as a target NAS server, a storage node where the target NAS server is located is taken as a source storage node, and the RPO of object i is taken as a target RPO.

In some embodiments, if multiple objects located in the same NAS server, such as object i and object j, all have overtime synchronization risks, an object located in the same NAS server is chosen as the target NAS server, a storage node where the same NAS server is located is chosen as the source storage node, and the longest RPO in object i and object j is chosen as the target RPO.

In some embodiments, if multiple objects located on different NAS servers have overtime synchronization risks, an NAS server {Nas server j,Iteration t} with the greatest overtime severity is chosen as the target NAS server, a storage node where the target NAS server is located is chosen as the source storage node, and the longest RPO in the objects is chosen as the target RPO. In summary, it is desired that storage nodes without overtime synchronization risks are chosen as optional nodes.

In block 510, other storage nodes meeting conditions are added to a list of optional nodes. For example, a replication session corresponding to any object k residing on storage node j needs to meet the following requirements:

$$|PredT\{Object\ k,Iteration\ t\} \leq RPO\{Object:k\} \quad (7)$$

where Object k represents any object on storage node j.

At block 512, the performance $P_{storage\ node\ j,\ target\ RPO}$ of each storage node j in the "list of optional nodes" in a future time period [t, t+target RPO]} is calculated, where j represents traversing each storage node in the list of optional nodes. At block 514, a storage node with a minimum value of $P_{storage\ node\ j,\ target\ RPO}$ is chosen as a current destination storage node according to a calculation result. At block 516, the target NAS server is moved from the source storage node to the destination storage node. For example, a storage position of the target object is adjusted from the source storage node to the target storage node. In some embodiments, in an iteration cycle, a storage node can only be chosen either as a source node or a target node once.

At block 518, it is checked whether iteration conditions are met. The iteration conditions may include that there are no selectable candidate storage nodes or no server will have synchronization overtime. If the iteration conditions are met, it returns to block 506. If the iteration conditions are not met, it proceeds to block 520, that is, method 500 ends.

In this way, by means of method 400 or method 500, the predicted upcoming iteration time may be used to evaluate an overtime synchronization event and its overtime severity, and this information is further used in a process of selecting a target NAS server. Therefore, the method of the present disclosure is more accurate and efficient.

In addition, performance evaluation of storage nodes includes system resources and system load, comprehensively considering reasonable factors affecting an automatic synchronization process of file replication sessions. This helps to find a moving direction of the destination and further effectively avoid the overtime synchronization risk.

Figure 6:
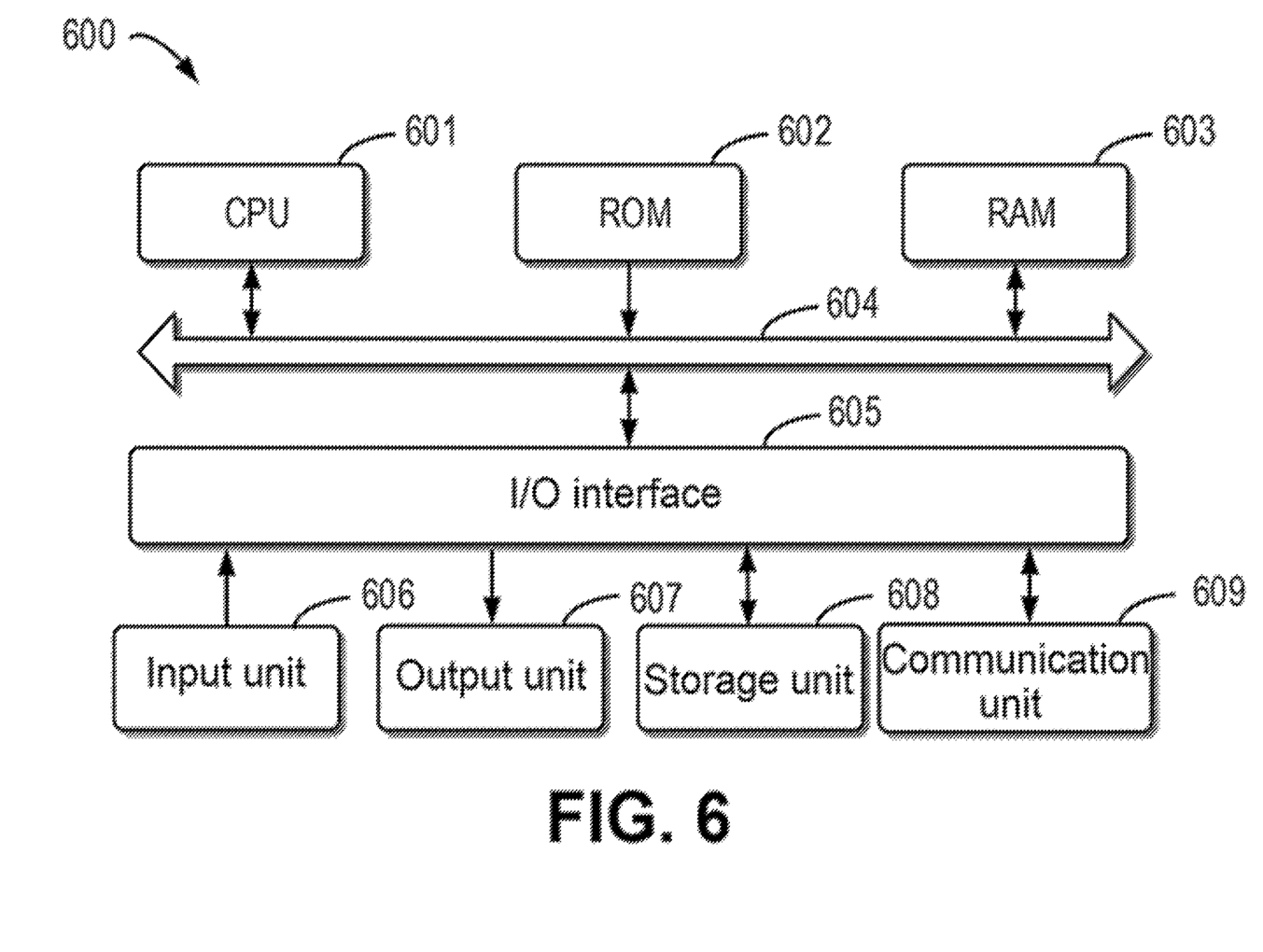
FIG. 6 schematically shows a block diagram of a device for data storage implemented according to an exemplary embodiment of the present disclosure.

FIG. 6 illustrates a schematic block diagram of device 600 that may be used to implement embodiments of the present disclosure. Device 600 may be a device or an apparatus as described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by CPU 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

What is claimed is:

1. A method, comprising:
   in response to that a predicted backup time of a target object is longer than a threshold time, determining, by a system comprising a processor, a target server and a source storage node that correspond to the target object, wherein the target server stores multiple objects, and wherein the target server is associated with the source storage node;
   determining multiple storage nodes for which respective predicted backup times for an object is shorter than a corresponding threshold time, the determining resulting in multiple candidate storage nodes;
   determining a target storage node based on respective multiple pieces of respective performance information of the multiple candidate storage nodes; and
   in response to determining the target storage node, adjusting a storage position of the target object from the source storage node to the target storage node.

2. The method according to claim 1, further comprising:
   determining the threshold time as a target threshold time, wherein determining the target storage node based on the respective multiple pieces of the respective performance information of the multiple candidate storage nodes comprises:
   determining a time period with a length of the target threshold time;
   determining, in the time period, respective performance scores associated with respective central processing unit (CPU) performances, respective memory performances, and respective input/output (I/O) load performances for the multiple candidate storage nodes; and
   determining a storage node of the multiple candidate storage nodes with a minimum performance score of the respective performance scores as the target storage node.

3. The method according to claim 2, wherein determining the respective performance scores associated with the respective CPU performances, the respective memory performances, and the respective I/O load performances comprises:
   determining respective first weighted sums of respective use percentages of respective CPUs of the multiple candidate storage nodes and respective use percentages of respective memories of the multiple candidate storage nodes as respective first performance scores;
   determining respective second weighted sums associated with respective I/O operations per second rates of the multiple candidate storage nodes and respective bandwidths of the multiple candidate storage nodes as respective second performance scores; and
   determining respective sums of the respective first performance scores and the respective second performance scores as the respective performance scores.

4. The method according to claim 1, wherein the target object is a first object, wherein the respective predicted backup times are first predicted backup times, wherein the threshold time is a first threshold time, wherein a second predicted backup time of a second object in the multiple objects is longer than a second threshold time, wherein the second object is different from the first object wherein and the first object is located in a first server and the second object is located in a second server, and wherein determining the target server and the source storage node that correspond to the target object comprises:
   in response to determining that the first server and the second server are a same server, determining the first server or the second server as the target server; or
   in response to that the first server and the second server are different servers, determining a server, of the first server and the second server, with a higher probability of synchronization overtime as the target server.

5. The method according to claim 4, wherein determining the server with the higher probability of synchronization overtime as the target server comprises:
   acquiring multiple predicted backup times of the multiple objects on the first server;
   determining multiple ratios, of differences between the multiple predicted backup times and corresponding threshold times to the corresponding threshold times, as multiple synchronization overtime scores; and
   determining a sum of the multiple synchronization overtime scores as a synchronization overtime probability of the first server.

6. The method according to claim 4, further comprising:
   in response to determining that the first threshold time and the second threshold time are equal, determining the first threshold time or the second threshold time as a target threshold time; or
   in response to determining that the first threshold time and the second threshold time are unequal, determining a larger one between the first threshold time and the second threshold time as the target threshold time.

7. The method according to claim 1, further comprising:
   backing up difference data of the target object in the threshold time to a remote storage system.

8. The method according to claim 1, further comprising performing operations iteratively until threshold conditions are satisfied, the operations comprising:

choosing another object, wherein a predicted backup time of the other object is longer than the corresponding threshold time;

determining another target server and another source storage node that correspond to the other object;

determining multiple other storage nodes for which respective other predicted backup times for the other object is shorter than the corresponding threshold time as other multiple candidate storage nodes;

determining another target storage node based on respective multiple other pieces of other performance information of the other multiple candidate storage nodes; and adjusting a storage position of the other object from the source storage node to the target storage node, wherein the threshold conditions comprise at least one of a first determination that there are no selectable candidate storage nodes, or a second determination that no server is going to have synchronization overtime.

9. A device, comprising:

a processor; and a memory coupled to the processor and storing an instruction therein, and the instruction, when executed by the processor, enables the device to execute operations comprising:

determining, in response to that a predicted backup time of a target object is longer than a threshold time, a target server and a source storage node, which correspond to the target object, wherein the target server stores multiple objects, and the target server is associated with the source storage node;

determining multiple candidate storage nodes for which predicted backup time for an object is shorter than a corresponding threshold time;

determining a target storage node based on multiple performance values of the multiple candidate storage nodes; and adjusting a storage position of the target object from the source storage node to the target storage node.

10. The device according to claim 9, wherein the operations further comprise:

determining the threshold time as a target threshold time, and wherein determining the target storage node based on the multiple performance values of the multiple candidate storage nodes comprises:

determining a time period with a length of the target threshold time;

determining, for the time period, a respective performance score associated with central processing unit (CPU) performance of a CPU, memory performance of a memory, and input/output load performance for each candidate storage node of the multiple candidate storage nodes; and determining a storage node of the multiple candidate storage nodes with a minimum performance score as the target storage node.

11. The device according to claim 10, wherein determining the respective performance score for each candidate storage node comprises:

determining a first weighted sum of a use percentage of the CPU and a use percentage of the memory as a first performance score;

determining a second weighted sum associated with input/output operations per second and a bandwidth as a second performance score; and determining a sum of the first performance score and the second performance score as the respective performance score.

12. The device according to claim 9, wherein the target object is a first object, the predicted backup time is a first predicted backup time, the threshold time is a first threshold time, a second predicted backup time of a second object in the multiple objects is longer than a second threshold time, the second object is different from the first object, and the first object is located in a first server and the second object is located in a second server, and wherein the determining the target server and the source storage node, which correspond to the target object, comprises:

determining, in response to that the first server and the second server are a same server, the first server or the second server as the target server, or determining, as between the first server and the second server, in response to that the first server and the second server are different servers, a server with a higher likelihood of synchronization overtime as the target server.

13. The device according to claim 12, wherein determining, in the first server and the second server, the server with the higher likelihood of synchronization overtime as the target server comprises:

acquiring multiple predicted backup times of the multiple objects on the first server;

determining multiple ratios of differences, between the multiple predicted backup times and corresponding threshold times to the corresponding threshold times, as multiple synchronization overtime scores; and determining a sum of the multiple synchronization overtime scores as a synchronization overtime likelihood of the first server.

14. The device according to claim 12, wherein the operations further comprise:

determining, in response to determining that the first threshold time and the second threshold time are equal, the first threshold time or the second threshold time as a target threshold time; or determining, in response to determining that the first threshold time and the second threshold time are unequal, a larger one between the first threshold time and the second threshold time as the target threshold time.

15. The device according to claim 9, wherein the operations further comprise:

backing up difference data of the target object in the threshold time to a remote storage system.

16. The device according to claim 9, wherein the operations further comprise a group of operations iteratively until there are no selectable candidate storage nodes or no server is determined to have synchronization overtime, the group of operations comprising:

choosing another object, wherein a predicted backup time of the other object is longer than another corresponding threshold time;

determining another target server and another source storage node, which correspond to the other object;

determining multiple other candidate storage nodes for which predicted backup time for the other object is shorter than the other corresponding threshold time;

determining a target storage node based on other multiple performance values of the multiple other candidate storage nodes; and adjusting a storage position of the other object from the source storage node to the target storage node.

17. A computer program product that is stored on a non-transitory computer-readable medium and comprises computer-executable instructions, wherein the computer-executable instructions, in response to execution by a device, cause the device to perform operations, comprising:
- in response to that a predicted backup time of a target object is longer than a threshold time, determining a target server and a source storage node that correspond to the target object, wherein the target server stores multiple objects and the target server is associated with the source storage node;
- determining multiple storage nodes, for which predicted backup time for an object is shorter than a corresponding threshold time, as multiple candidate storage nodes;
- determining a target storage node based on the multiple metrics of performance of the multiple candidate storage nodes; and
- adjusting a storage position of the target object from the source storage node to the target storage node.

18. The computer program product according to claim 17, wherein the operations further comprises:
- determining the threshold time as a target threshold time, and
- wherein determining the target storage node based on the multiple metrics of performance of the multiple candidate storage nodes comprises:
- determining a time period with a length of the target threshold time;
- determining, for the time period, a performance score associated with a central processing unit (CPU) performance of a CPU, memory performance of a memory, and input/output load performance for each candidate storage node; and
- determining a storage node with a minimum performance score as the target storage node.

19. The computer program product according to claim 18, wherein determining the performance score associated with the CPU performance, the memory performance, and the input/output load performance comprises:
- determining a weighted sum of a use percentage of the CPU and a use percentage of the memory as a first performance score;
- determining a weighted sum associated with input/output operations per second and a bandwidth as a second performance score; and
- determining a sum of the first performance score and the second performance score as the performance score.

20. The computer program product according to claim 17, wherein the target object is a first object, the predicted backup time is a first predicted backup time, the threshold time is a first threshold time, a second predicted backup time of a second object in the multiple objects is longer than a second threshold time, the second object is different from the first object, and the first object is located in a first server and the second object is located in a second server, and wherein determining the target server and the source storage node that correspond to the target object comprises:
- determining, in response to that the first server and the second server are a same server, the first server or the second server as the target server; or
- determining, in response to that the first server and the second server are different servers, a server, from the first server or the second server, having a higher possibility of synchronization overtime as the target server.

* * * * *